Jan. 31, 1956
T. B. CHACE
2,732,859
FLUID MIXING DEVICE
Filed Nov. 2, 1950
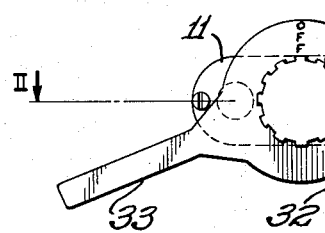
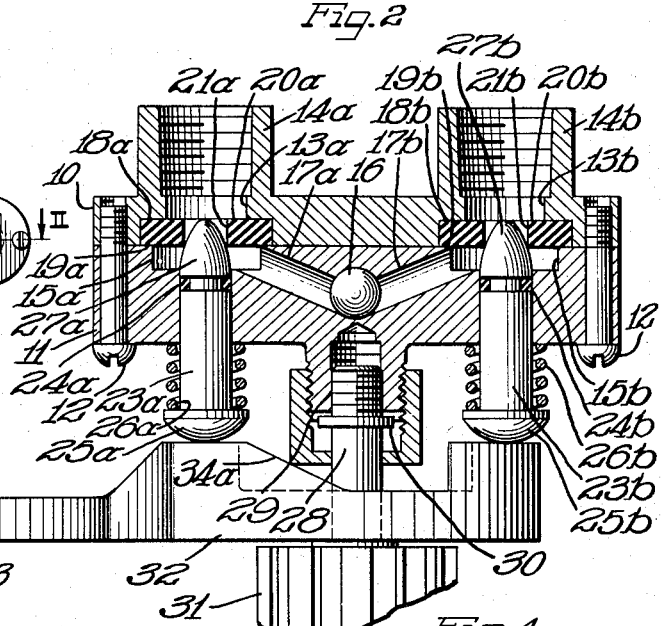
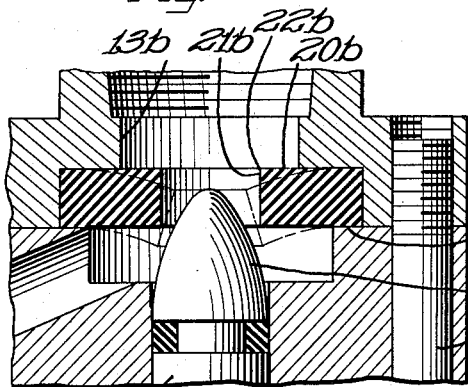
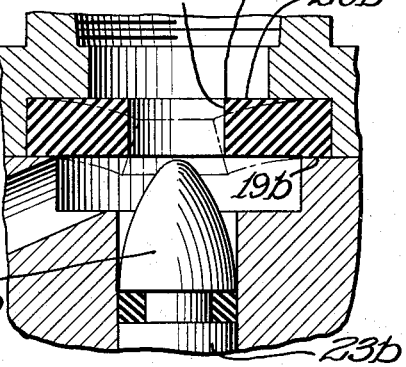
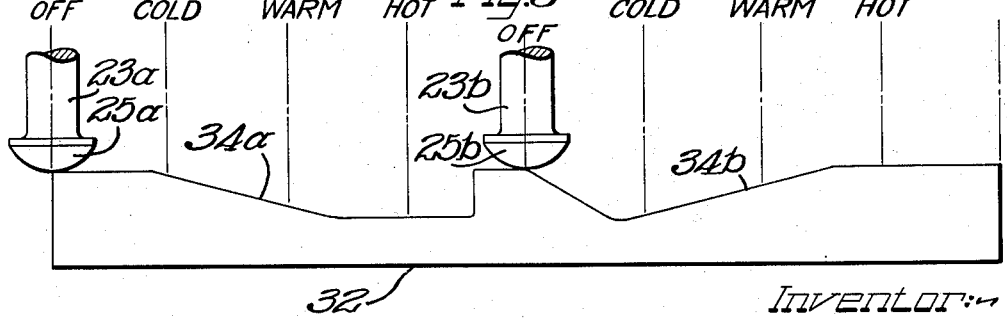
Inventor:
Thomas B. Chace
by Hill, Sherman, Meroni, Gross & Simpson
Attys United States Patent Office 2,732,859
Patented Jan. 31, 1956

2,732,859

FLUID MIXING DEVICE

Thomas B. Chace, Chicago, Ill., assignor to The Dole Valve Company, Chicago, Ill., a corporation of Illinois Application November 2, 1950, Serial No. 193,731

4 Claims. (Cl. 137—607)

This invention relates to a device for mixing fluids in any desired proportion.

In many places where fluid must be mixed, it is desirable to maintain a constant proportion between the mixed fluids and a constant rate of flow. For example, in shower-bath installations, where hot and cold water must generally be mixed to obtain a desired water temperature, the pressure in the cold water and the hot water lines supplying the shower head are apt to vary over a considerable range due to opening of other valves in the supply system, etc. This results in a variable water pressure at the shower head with associated discomforts to a person using the shower.

An object of this invention is to provide a device for mixing fluids in any desired constant proportion.

A further object of this invention is to provide a device for mixing fluids in any desired constant proportion having means for adjusting the proportion of the fluids and the rate of flow.

A still further object of this invention is to provide a device for mixing hot and cold water in any desired constant proportion for supply to a shower head and having means to regulate the proportion of hot and cold water and the rate of flow from the device.

In accordance with the general features of this invention there is provided a casing having two inlets and an outlet, a resilient disk member in each inlet, each disk member having openings therein, and an axially movable plunger for each inlet having an end surface movable into the opening in said disk, the resilient disk and the end surface of the plunger cooperating to maintain a substantially constant flow of fluid from each inlet to the outlet.

Another feature of the invention relates to the provision of a casing having a plurality of inlets and an outlet, movable plungers disposed at the inlets to control the rate of fluid flow from the inlets to the outlet, and a movable member having cam surfaces thereon engaging the plungers to adjust the proportion of fluid supplied from the inlet to the outlet.

Other objects and features of this invention will more fully appear from the following detailed description taken in connection with the accompanying drawings which illustrate a single embodiment thereof and in which:

Figure 1 is an elevational view of the device;

Figure 2 is a plan view partially in section, on an enlarged scale, of the device of Figure 1;

Figure 3 is an enlarged detail view, partly in section, of a portion of the device;

Figure 4 is a view similar to Figure 3, showing a part in a different position; and Figure 5 is a development of a cam surface on a member of the device, to more clearly illustrate the operation thereof.

Referring to the drawings, the device of the present invention has a casing formed of two parts 10 and 11 secured together by means of screws 12. Part 10 has openings 13a and 13b forming fluid inlets. Internally threaded flanges 14a and 14b form means for connecting the inlets to any desired sources of fluid. Recesses 15a and 15b in part 11 are aligned with openings 13a and 13b, and are connected to an outlet 16 by means of ducts 17a and 17b.

Recesses 18a and 18b, in part 10, expose annular portions of the face of part 11 surrounding recesses 15a and 15b to provide shoulders 19a and 19b. Seated on shoulders 19a and 19b, and within the recesses 18a and 18b, are resilient disk members 20a and 20b having central openings 21a and 21b therein. Members 20a and 20b may be of any resilient, elastic material. Rubber or rubber-like materials, such as "neoprene," "Servene" and the like, are suitable.

Plungers 23a and 23b are disposed concentrically with openings 21a and 21b, respectively, and are axially movable in openings in part 11. Sealing washers 24a and 24b are disposed on the plungers 23a and 23b and ride in the openings in part 11 to prevent escape of fluid therefrom. Plungers 23a and 23b have heads 25a and 25b thereon and compression springs 26a and 26b are disposed between the heads and the casing to urge the plungers away from the casing. Plungers 23a and 23b have generally rounded end portions 27a and 27b movable into openings 21a and 21b.

Reference numeral 28 designates a shaft which has threads 29 on one end portion so that the shaft can be screwed into a threaded opening in the casing, as shown. An annular abutment 30 on shaft 28 limits its movement into the casing. A knob 31 is provided at one end of shaft 28 so that the shaft may be readily manually screwed into the opening in the casing. Rotatably disposed on the shaft 28 is a member 32 which has a handle 33 secured thereto. Member 32 has annular cam surfaces 34a and 34b thereon engaging the rounded heads 25a and 25b of the plungers so that rotation of member 32 will move the plungers axially.

The fluid control means formed by resilient disk 20a and plunger 23a and the fluid control means formed by resilient disk 20b and plunger 23b operate in the same manner and the operation of only one fluid control means will be described, it being understood that such description applies as well to the other fluid control means. Referring to Figure 3, with no fluid under pressure at the inlet 13b, the resilient disk 20b will be in the full line position illustrated. Fluid under pressure applied at the inlet 13b will contact the upper surface of the resilient disk 20b and flex it toward the plunger surface 27b to a position such as illustrated in broken lines. During such displacement, the edge 22b of disk 20b at the opening 21b will effectively pivot about the inside edge of shoulder 19b and will move radially inwardly, thus reducing the size of the orifice presented by the disk.

The displacement of the disk toward surface 27b by fluid under pressure at the inlet also reduces the fluid flow passageway formed by the surface and the boundary of the opening. The effect of the reduction in the size of the passageway with increased inlet fluid pressure augments the effect of reduction in the diameter of edge portion 22b. The total effect obtained is dependent upon the dimensions and resiliency of disk 20b, the diameter of shoulder 19b, the shape of surface 27b and the position of the surface with respect to the disk. With proper design a substantially constant fluid flow with variations of input pressure over a wide range can be obtained.

Figs. 2, 3 and 4 show the plunger 23b in three different positions. In Fig. 2 the surface 27b closes the opening 21b and prevents flow of fluid; in Fig. 3 the surface 27b is spaced from the opening and permits a flow of fluid; and in Fig. 4 the surface 27b is at a greater spacing from opening 21b and permits a greater flow of fluid. It is thus seen that the axial position of the plunger 23 can be adjusted to obtain any desired fluid flow within limits.

With proper design of the shape of surface 27b, the rate of fluid flow at any axial position of the plunger can be maintained substantially constant with a variation of inlet pressure over a wide range.

Fig. 5 is a development on a plane surface of the peripheral surface of member 32 for illustrating the operation of cam surfaces 34a and 34b in operating the plungers 23a and 23b. If the mixing device of the present invention is to be used to mix hot and cold water for application to a shower head, hot water may be supplied to inlet 13a and cold water may be supplied to 13b, the control member 32 may be marked "off," "cold," "warm," and "hot" as illustrated in Fig. 1 and the cam surface on control member 32 may be formed as best illustrated in Fig. 5.

When the handle 33 is rotated counterclockwise as viewed in Fig. 1, the cam surfaces 34a and 34b as viewed in Figure 5, will move to the left. When the handle is moved counterclockwise from the "off" position to the "cold" position, plunger 23b will be moved away from disk 20b to permit flow of cold water from inlet 13b to outlet 16 and the plunger 23a will remain in a position closing opening 21a so that no hot water will flow, and the water supplied to outlet 16 will be entirely cold. Counterclockwise movement of the handle 33 will permit, through the operation of cam surfaces 34a and 34b, an increasing flow of hot water and a decreasing flow of cold water until the "hot" position is reached in which no cold water will flow and the entire flow at outlet 16 will be hot water. It is thus seen that hot and cold water may be mixed in a desired proportion.

After the desired proportion of hot and cold water is obtained, the knob 31 may be rotated to move control member 32 toward or away from the casing and move plunger 23a and 23b together axially so that the desired rate of flow from the outlet 16 may be obtained.

Although the fluid control device of the present invention is illustrated for use in controlling the supply of hot and cold water to a shower head, it is apparent that the device can be used where it is desired to obtain a constant rate of flow of any fluids mixed in any desired proportion.

It will be understood that modifications and variations may be effected without departing from the scope of the novel concepts of the present invention.

I claim as my invention:

1. A fluid mixing device comprising a casing having a pair of inlets and an outlet, fluid flow control means between each inlet and said outlet, each of said fluid flow control means comprising a resilient member having an edge portion and means defining a surface adjacent to said edge portion to define therewith a fluid flow passageway, said resilient members being displaceable toward said surfaces by fluid under pressure from said inlet to reduce the size of said passageways, the spaced relation of said edge portions with respect to said surfaces being adjustable, and adjustable means for simultaneously decreasing the spacing of one of said surfaces and one edge portion and increasing the spacing of the other of said surfaces and the other edge portion.

2. A fluid mixing device comprising a casing having a plurality of inlets and an outlet, fluid flow control means between each inlet and said outlet, each of said fluid flow control means comprising a resilient disk having a central opening therein and means defining a surface adjacent said opening to define with the boundary of said opening a fluid flow passageway, said resilient disks at said openings being displaceable toward said surfaces by fluid under pressure of said inlets to reduce the size of said passageways, and adjustable means for simultaneously reducing the spacing of one of said surfaces and one edge portion and increasing the spacing of the other of said surfaces and the other edge portion.

3. A fluid mixing device comprising a casing having a pair of inlets and an outlet, fluid flow control means between each inlet and said outlet, each of said fluid flow control means comprising a resilient member having a central opening therein and an axially movable plunger having an end surface adjacent said opening to define with the boundary of each opening a fluid flow passageway, said resilient disks at said openings being displaceable toward said surfaces by fluid under pressure from said inlets to reduce the size of said passageways, and an adjustably movable member for moving one of said plungers toward one resilient member while moving the other of said plungers away from the other resilient member.

4. In a fluid control device including a casing having a pair of fluid inlets and an outlet, a first resilient flow control annulus supported in said casing in the path of flow from one inlet to said outlet with an inner edge deflectible toward the outlet in response to variations in pressure, a second resilient flow control annulus supported in said casing in the path of flow from the other inlet to said outlet with an inner edge deflectible toward said outlet in response to variations in pressure, a first plunger-like element with its extremity aligned with and projecting into the opening of said first annulus for cooperation with said inner edge of said first annulus in controlling the rate of flow to said outlet, a second plunger-like element with its extremity aligned with and projecting into the opening of said second annulus for cooperation with said inner edge of said second annulus in controlling the rate of flow to said outlet, and a reciprocable control member adjustably movable in one direction for increasing the spacing of the extremity of said first element and said first annulus and decreasing the spacing of the extremity of said second element and said second annulus, and adjustably movable in the other direction for reversely changing said spacings.

References Cited in the file of this patent

UNITED STATES PATENTS

| | | |
|---|---|---|
| 966,682 | Gowip | Aug. 9, 1910 |
| 2,322,157 | Porter | June 15, 1943 |
| 2,328,805 | Hotthouse | Sept. 7, 1943 |
| 2,334,990 | Brown | Nov. 23, 1943 |
| 2,444,677 | Rosenblum | July 6, 1948 |
| 2,500,750 | Halenza | Mar. 4, 1950 |

FOREIGN PATENTS

| | | |
|---|---|---|
| 626,608 | Great Britain | July 19, 1949 |